(12) United States Patent
Gorrell et al.

(10) Patent No.: US 7,359,589 B2
(45) Date of Patent: Apr. 15, 2008

(54) COUPLING ELECTROMAGNETIC WAVE THROUGH MICROCIRCUIT

(75) Inventors: Jonathan Gorrell, Gainesville, FL (US); Mark Davidson, Florahome, FL (US); Michael E Maines, Gainesville, FL (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 0 days.

(21) Appl. No.: 11/418,082

(22) Filed: May 5, 2006

(65) Prior Publication Data

US 2007/0258689 A1   Nov. 8, 2007

(51) Int. Cl.
| | |
|---|---|
| *G02B 6/12* | (2006.01) |
| *G02B 6/32* | (2006.01) |
| *G02B 6/36* | (2006.01) |
| *G02B 6/02* | (2006.01) |
| *H01S 3/08* | (2006.01) |

(52) U.S. Cl. .......................... 385/14; 385/31; 385/89; 385/129; 372/92

(58) Field of Classification Search .............. 385/129, 385/14
See application file for complete search history.

(56) References Cited

U.S. PATENT DOCUMENTS

| | | |
|---|---|---|
| 1,948,384 A | 2/1934 | Lawrence |
| 2,307,086 A | 1/1943 | Varian et al. |
| 2,431,396 A | 11/1947 | Hansell |
| 2,473,477 A | 6/1949 | Smith |
| 2,634,372 A | 4/1953 | Salisbury |
| 2,932,798 A | 4/1960 | Kerst et al. |
| 3,571,642 A | 3/1971 | Westcott |
| 3,761,828 A | 9/1973 | Pollard et al. |
| 3,923,568 A | 12/1975 | Bersin |
| 3,989,347 A | 11/1976 | Eschler |
| 4,282,436 A | 8/1981 | Kapetanakos |
| 4,482,779 A | 11/1984 | Anderson |
| 4,727,550 A | 2/1988 | Chang et al. |
| 4,740,973 A | 4/1988 | Madey |

(Continued)

FOREIGN PATENT DOCUMENTS

EP          0237559          12/1991

(Continued)

OTHER PUBLICATIONS

"Array of Nanoklystrons for Frequency Agility or Redundancy," NASA's Jet Propulsion Laboratory, NASA Tech Briefs, NPO-21033. 2001.

(Continued)

*Primary Examiner*—Michelle Connelly-Cushwa
*Assistant Examiner*—Rhonda S. Peace
(74) *Attorney, Agent, or Firm*—Davidson Berquist Jackson & Gowdey LLP

(57) ABSTRACT

A device includes a waveguide layer formed on a substrate. An ultra-small resonant structure emits electromagnetic radiation (EMR) in the waveguide layer. One or more circuits are formed on the waveguide layer and each operatively connected thereto to receive the EMR emitted by the ultra-small resonant structure. The waveguide layer may be transparent at wavelengths corresponding to wavelengths of the EMR emitted by the ultra-small resonant structure. The EMR may be visible light and may encode a data signal such as a clock signal.

23 Claims, 3 Drawing Sheets

U.S. PATENT DOCUMENTS

| | | |
|---|---|---|
| 4,746,201 A | 5/1988 | Gould |
| 4,829,527 A | 5/1989 | Wortman et al. |
| 4,838,021 A | 6/1989 | Beattie |
| 5,023,563 A | 6/1991 | Harvey et al. |
| 5,157,000 A | 10/1992 | Elkind et al. |
| 5,163,118 A | 11/1992 | Lorenzo et al. |
| 5,185,073 A | 2/1993 | Bindra |
| 5,199,918 A | 4/1993 | Kumar |
| 5,262,656 A * | 11/1993 | Blondeau et al. ............. 257/80 |
| 5,263,043 A | 11/1993 | Walsh |
| 5,268,693 A | 12/1993 | Walsh |
| 5,268,788 A | 12/1993 | Fox et al. |
| 5,302,240 A | 4/1994 | Hori et al. |
| 5,354,709 A | 10/1994 | Lorenzo et al. |
| 5,446,814 A * | 8/1995 | Kuo et al. .................... 385/31 |
| 5,608,263 A | 3/1997 | Drayton et al. |
| 5,668,368 A | 9/1997 | Sakai et al. |
| 5,705,443 A | 1/1998 | Stauf et al. |
| 5,737,458 A | 4/1998 | Wojnarowski et al. |
| 5,744,919 A | 4/1998 | Mishin et al. |
| 5,757,009 A | 5/1998 | Walstrom |
| 5,767,013 A | 6/1998 | Park |
| 5,790,585 A | 8/1998 | Walsh |
| 5,811,943 A | 9/1998 | Mishin et al. |
| 5,821,836 A | 10/1998 | Katehi et al. |
| 5,821,902 A | 10/1998 | Keen |
| 5,831,270 A | 11/1998 | Nakasuji |
| 5,847,745 A | 12/1998 | Shimizu et al. |
| 5,889,449 A | 3/1999 | Fiedziuszko |
| 5,902,489 A | 5/1999 | Yasuda et al. |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,195,199 B1 * | 2/2001 | Yamada ....................... 359/333 |
| 6,222,866 B1 | 4/2001 | Seko |
| 6,281,769 B1 | 8/2001 | Fiedziuszko |
| 6,297,511 B1 | 10/2001 | Syllaios et al. |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,504,303 B2 | 1/2003 | Small |
| 6,545,425 B2 | 4/2003 | Victor |
| 6,577,040 B2 | 6/2003 | Nguyen |
| 6,603,915 B2 * | 8/2003 | Glebov et al. .............. 385/129 |
| 6,624,916 B1 | 9/2003 | Green et al. |
| 6,636,653 B2 | 10/2003 | Miracky et al. |
| 6,642,907 B2 | 11/2003 | Hamada et al. |
| 6,738,176 B2 | 5/2004 | Rabinowitz et al. |
| 6,741,781 B2 * | 5/2004 | Furuyama ................... 385/129 |
| 6,782,205 B2 | 8/2004 | Trisnadi et al. |
| 6,791,438 B2 | 9/2004 | Takahashi et al. |
| 6,829,286 B1 * | 12/2004 | Guilfoyle et al. ............ 372/108 |
| 6,834,152 B2 | 12/2004 | Gunn et al. |
| 6,870,438 B1 | 3/2005 | Shino et al. |
| 6,885,262 B2 | 4/2005 | Nishimura et al. |
| 6,909,092 B2 | 6/2005 | Nagahama |
| 6,909,104 B1 * | 6/2005 | Koops et al. ............. 250/493.1 |
| 6,944,369 B2 | 9/2005 | Deliwala |
| 6,953,291 B2 | 10/2005 | Liu |
| 6,965,625 B2 | 11/2005 | Mross et al. |
| 6,995,406 B2 | 2/2006 | Tojo et al. |
| 7,010,183 B2 | 3/2006 | Estes et al. |
| 7,092,588 B2 * | 8/2006 | Kondo ......................... 385/14 |
| 7,092,603 B2 * | 8/2006 | Glebov et al. ................ 385/51 |
| 7,122,978 B2 | 10/2006 | Nakanishi et al. |
| 7,177,515 B2 | 2/2007 | Estes et al. |
| 2001/0025925 A1 | 10/2001 | Abe et al. |
| 2002/0009723 A1 | 1/2002 | Hefti |
| 2002/0027481 A1 | 3/2002 | Fiedziuszko |
| 2002/0053638 A1 | 5/2002 | Winkler et al. |
| 2002/0135665 A1 | 9/2002 | Gardner |
| 2003/0012925 A1 | 1/2003 | Gorrell |
| 2003/0016412 A1 | 1/2003 | Small |
| 2003/0016421 A1 | 1/2003 | Small |
| 2003/0034535 A1 | 2/2003 | Barenburu et al. |
| 2003/0155521 A1 | 8/2003 | Feuerbaum |
| 2003/0164947 A1 | 9/2003 | Vaupel |
| 2003/0179974 A1 | 9/2003 | Estes et al. |
| 2003/0206708 A1 | 11/2003 | Estes et al. |
| 2004/0061053 A1 | 4/2004 | Taniguchi et al. |
| 2004/0108473 A1 | 6/2004 | Melnychuk et al. |
| 2004/0136715 A1* | 7/2004 | Kondo ......................... 398/82 |
| 2004/0150991 A1 | 8/2004 | Ouderkirk et al. |
| 2004/0171272 A1 | 9/2004 | Jin et al. |
| 2004/0180244 A1 | 9/2004 | Tour et al. |
| 2004/0213375 A1 | 10/2004 | Bjorkholm et al. |
| 2004/0217297 A1 | 11/2004 | Moses et al. |
| 2004/0231996 A1 | 11/2004 | Webb |
| 2004/0264867 A1* | 12/2004 | Kondo ......................... 385/49 |
| 2005/0023145 A1 | 2/2005 | Cohen et al. |
| 2005/0054151 A1 | 3/2005 | Lowther et al. |
| 2005/0067286 A1 | 3/2005 | Ahn et al. |
| 2005/0082469 A1 | 4/2005 | Carlo |
| 2005/0092929 A1 | 5/2005 | Schneiker |
| 2005/0105690 A1 | 5/2005 | Pau et al. |
| 2005/0145882 A1 | 7/2005 | Taylor et al. |
| 2005/0162104 A1 | 7/2005 | Victor et al. |
| 2005/0190637 A1 | 9/2005 | Ichimura et al. |
| 2005/0194258 A1 | 9/2005 | Cohen et al. |
| 2005/0201707 A1* | 9/2005 | Glebov et al. .............. 385/132 |
| 2005/0201717 A1 | 9/2005 | Matsumura et al. |
| 2005/0212503 A1 | 9/2005 | Deibele |
| 2005/0249451 A1 | 11/2005 | Baehr-Jones et al. |
| 2006/0007730 A1 | 1/2006 | Nakamura et al. |
| 2006/0018619 A1 | 1/2006 | Helffrich et al. |
| 2006/0035173 A1 | 2/2006 | Davidson et al. |
| 2006/0045418 A1* | 3/2006 | Cho et al. .................... 385/31 |
| 2006/0060782 A1 | 3/2006 | Khursheed |
| 2006/0062258 A1 | 3/2006 | Brau et al. |
| 2006/0159131 A1 | 7/2006 | Liu et al. |
| 2006/0164496 A1 | 7/2006 | Tokutake et al. |
| 2006/0216940 A1 | 9/2006 | Gorrell et al. |
| 2007/0003781 A1 | 1/2007 | de Rochemont |
| 2007/0013765 A1 | 1/2007 | Hudson et al. |
| 2007/0075264 A1 | 4/2007 | Gorrell et al. |
| 2007/0086915 A1 | 4/2007 | LeBoeuf et al. |
| 2007/0116420 A1 | 5/2007 | Estes et al. |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 02/025785 | 3/2002 |
| WO | WO 02/077607 | 10/2002 |
| WO | WO 2004/086560 | 10/2004 |
| WO | WO 2005/015143 A2 | 2/2005 |
| WO | WO 2006/042239 A2 | 4/2006 |
| WO | WO 2007/018389 | 7/2007 |
| WO | WO 2007/081390 | 7/2007 |
| WO | WO 2007/081391 | 7/2007 |

OTHER PUBLICATIONS

"Hardware Development Programs," Calabazas Creek Research, Inc. found at http://calcreek.com/hardware.html.

"Antenna Arrays." May 18, 2002. www.tpub.com/content/neets/14183/css/14183_159.htm.

"Diffraction Grating," hyperphysics.phy-astr.gsu.edu/hbase/phyopt/grating.html

Alford, T.L. et al., "Advanced silver-based metallization patterning for ULSI applications," Microelectronic Engineering 55, 2001, pp. 383-388, Elsevier Science B.V.

Amato, Ivan, "An Everyman's Free-Electron Laser?" Science, New Series, Oct. 16, 1992, p. 401, vol. 258 No. 5081, American Association for the Advancement of Science.

Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.

Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany.

Bakhtyari, A. et al., "Horn Resonator Boosts Miniature Free-Electron Laser Power," Applied Physics Letters, May 12, 2003, pp. 3150-3152, vol. 82, No. 19, American Institute of Physics.

Bakhtyari, Dr. Arash, "Gain Mechanism in a Smith-Purcell MicroFEL," Abstract, Department of Physics and Astronomy, Dartmouth College.

Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.

Booske, J.H. et al., "Microfabricated TWTs as High Power, Wideband Sources of THz Radiation".

Brau, C.A. et al., "Gain and Coherent Radiation from a Smith-Purcell Free Electron Laser," Proceedings of the 2004 FEL Conference, pp. 278-281.

Brownell, J.H. et al., "Improved μFEL Performance with Novel Resonator," Jan. 7, 2005, from website: www.frascati.enea.it/thz-bridge/workshop/presentations/Wednesday/We-07-Brownell.ppt.

Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.

Chuang, S.L. et al., "Enhancement of Smith-Purcell from a Grating with Surface-Plasmon Excitation," Journal of the Optical Society of America, Jun. 1984, pp. 672-676, vol. 1 No. 6, Optical Society of America.

Chuang, S.L. et al., "Smith-Purcell Radiation from a Charge Moving Above a Penetrable Grating," IEEE MTT-S Digest, 1983, pp. 405-406, IEEE.

Far-IR, Sub-MM & MM Detector Technology Workshop list of manuscripts, session 6 2002.

Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.

Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.

Gallerano, G.P. et al., "Overview of Terahertz Radiation Sources," Proceedings of the 2004 FEL Conference, pp. 216-221.

Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.

Gover, A. et al., "Angular Radiation Pattern of Smith-Purcell Radiation," Journal of the Optical Society of America, Oct. 1984, pp. 723-728, vol. 1 No. 5, Optical Society of America.

Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.

Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.

Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.

Ives, Lawrence et al., "Development of Backward Wave Oscillators for Terahertz Applications," Terahertz for Military and Security Applications, Proceedings of SPIE vol. 5070 (2003), pp. 71-82.

Ives, R. Lawrence, "IVEC Summary, Session 2, Sources I" 2002.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 pp. 117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA.

Kormann, T. et al., "A Photoelectron Source for the Study of Smith-Purcell Radiation".

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

Manohara, Harish M. et al., "Design and Fabrication of a THz Nanoklystron".

Manohara, Harish M. et al., "Design and Fabrication of a THz Nanoklystron" (www.sofia.usra.edu/det_workshop/posters/session 3/3-43manohara_poster.pdf), PowerPoint Presentation.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in Cl2/O2 and O2 glow discharges," J. Vac. Sci, Technol. B. 17 (5), Sep./Oct, 1999, American Vaccum Society, pp. 2204-2209.

Ohtaka, Kauzo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Phototonics Research, "Surface-Plasmon-Enhanced Random Laser Demonstrated," Phototonics Spectra, Feb. 2005, pp. 112-113.

Platt, C.L. et al., "A New Resonator Design for Smith-Purcell Free Electron Lasers," 6Q19, p. 296.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 μm quantum dot laser with temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.

Markoff, John, "A Chip That Can Transfer Data Using Laser Light," The New York Times, Sep. 18, 2006.

S.M. Sze, "Semiconductor Devices Physics and Technology", 2nd Edition, Chapters 9 and 12, Copyright 1985, 2002.

Search Report and Written Opinion mailed Feb. 12, 2007 in corresponding PCT Appln. No. PCT/US2006/022682.

Search Report and Written Opinion mailed Feb. 20, 2007 in corresponding PCT Appln. No. PCT/US2006/022676.

Search Report and Written Opinion mailed Feb. 20, 2007 in corresponding PCT Appln. No. PCT/US2006/022772.

Search Report and Written Opinion mailed Feb. 20, 2007 in corresponding PCT Appln. No. PCT/US2006/022780.

Search Report and Written Opinion mailed Feb. 21, 2007 in corresponding PCT Appln. No. PCT/US2006/022684.

Search Report and Written Opinion mailed Jan. 17, 2007 in corresponding PCT Appln. No. PCT/US2006/022777.

Search Report and Written Opinion mailed Jan. 23, 2007 in corresponding PCT Appln. No. PCT/US2006/022781.

Search Report and Written Opinion mailed Mar. 7, 2007 in corresponding PCT Appln. No. PCT/US2006/022775.

Speller et al., "A Low-Noise MEMS Accelerometer for Unattended Ground Sensor Applications", Applied MEMS Inc., 12200 Parc Crest, Stafford, TX, USA 77477.

Thurn-Albrecht et al., "Ultrahigh-Density Nanowire Arrays Grown in Self-Assembled Diblock Copolymer Templates", Science 290. 5499, Dec. 15, 2000, pp. 2126-2129.

International Search Report and Written Opinion mailed Nov. 23, 2007 in International Application No. PCT/US2006/022786.

Search Report and Written Opinion mailed Oct. 25, 2007 in PCT Appln. No. PCT/US2006/022687.

Search Report and Written Opinion mailed Oct. 26, 2007 in PCT Appln. No. PCT/US2006/022675.

Search Report and Written Opinion mailed Sep. 21, 2007 in PCT Appln. No. PCT/US2006/022688.

Search Report and Written Opinion mailed Sep. 25, 2007 in PCT Appln. No. PCT/US2006/022681.

Search Report and Written Opinion mailed Sep. 26, 2007 in PCT Appln. No. PCT/US2006/024218.

Search Report and Written Opinion mailed Aug. 24, 2007 in PCT Appln. No. PCT/US2006/022768.

Search Report and Written Opinion mailed Aug. 31, 2007 in PCT Appln. No. PCT/US2006/022680.

Search Report and Written Opinion mailed Jul. 16, 2007 in PCT Appln. No. PCT/US2006/022774.

Search Report and Written Opinion mailed Jul. 20, 2007 in PCT Appln. No. PCT/US2006/024216.

Search Report and Written Opinion mailed Jul. 26, 2007 in PCT Appln. No. PCT/US2006/022776.

Search Report and Written Opinion mailed Jun. 20, 2007 in PCT Appln. No. PCT/US2006/022779.

Search Report and Written Opinion mailed Sep. 12, 2007 in PCT Appln. No. PCT/US2006/022767.

Search Report and Written Opinion mailed Sep. 13, 2007 in PCT Appln. No. PCT/US2006/024217.

Search Report and Written Opinion mailed Sep. 17, 2007 in PCT Appln. No. PCT/US2006/027428.

Search Report and Written Opinion mailed Sep. 5, 2007 in PCT Appln. No. PCT/US2006/027428.

Search Report and Written Opinion mailed Sep. 17, 2007 in PCT Appln. No. PCT/US2006/022689.

* cited by examiner

COUPLING ELECTROMAGNETIC WAVE THROUGH MICROCIRCUIT

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

RELATED APPLICATIONS

The present invention is related to the following co-pending U.S. patent applications, each which is commonly owned with the present application at the time of filing, and the entire contents of each of which are incorporated herein by reference:
1. application Ser. No. 10/917,511, filed on Aug. 13, 2004, entitled "Patterning Thin Metal Film by Dry Reactive Ion Etching";
2. application Ser. No. 11/203,407, filed Aug. 15, 2005, entitled "Method of Patterning Ultra-Small Structures,"
3. application Ser. No. 11/243,476, filed Oct. 5, 2005, entitled, "Structures and Methods for Coupling Energy from an Electromagnetic Wave";
4. application Ser. No. 11/243,477, filed Oct. 5, 2005, entitled, "Electron Beam Induced Resonance";
5. application Ser. No. 11/238,991, filed Sep. 30, 2005, entitled, "Ultra-small resonating charged particle beam modulator";
6. application Ser. No. 11/302,471, filed Dec. 14, 2005, entitled, "Coupled Nano-Resonating Energy Emitting Structures";
7. application Ser. No. 11/325,432, filed Jan. 5, 2006, entitled, "Resonant Structure-Based Display";
8. application Ser. No. 11/325,448, filed Jan. 5, 2006, entitled, "Selectable Frequency Light Emitter";
9. application Ser. No. 11/325,571, filed Jan. 5, 2006, entitled, "Switching Micro-Resonant Structures by Modulating a Beam of Charged Particles"; and
10. application Ser. No. 11/325,534, filed Jan. 5, 2006, entitled, "Switching Micro-Resonant Structures Using at Least One Director";
11. application Ser. No. 11/400,280, filed Apr. 10, 2006, entitled "Resonant Detector For Optical Signals".

FIELD OF THE INVENTION

This relates in general to semiconductor components and, more particularly, to coupling signals throughout semiconductor components.

BACKGROUND & INTRODUCTION

Semiconductor manufacturers are constantly striving to keep up with applications that require faster speeds for their microprocessors or microcircuits. For example, at clock speeds greater than three gigahertz, a microcircuit can be required to couple signals to billions of transistors. Further, microcircuits are continuing to be used over a variety of applications requiring faster speed including modeling and simulation, games, and internet video processing. It is anticipated that microcircuits having faster speeds will continue to be designed for a broad range of systems such as highly parallel supercomputers, back-end servers, desktop systems, and a number of embedded applications.

The industry has made tremendous strides in reducing the gate delays within individual devices of a semiconductor component or microcircuit. This improvement in device speed is generally limited by the conductors between the devices. The conductors can include heavily doped semiconductor materials or conductive metal strips and are commonly referred to as metallization. Generally, the microcircuit includes a plurality of alternating layers of conductors and insulators or dielectric layers. The velocity of propagation of a signal through the conductor is a function of conductor delay. The delay typically depends on a number of factors including the type of conductor material, operating frequency, length of the conductor, spacing between conductors and the permittivity of the dielectric layers adjacent to the conductor. In one example, the conductors of a synchronous digital circuit are required to carry the clock pulses to thousands of locations on the microcircuit at precisely the same time. As the clock speeds increase, the conductor delays can result in a loss in synchronization such that the microcircuit cannot function correctly. By changing the conductor material from aluminum to copper, manufacturers have been able to reduce the delay of signals through their microcircuits. Further, manufacturers have reduced the permittivity or dielectric constant of the dielectric layers, thereby reducing the capacitance between the conductor and the dielectric layer. For example, materials such as hydrogen silsesquioxane (HSQ), methyl silsesquioxane (MSQ), fluorinated glass, or NANOGLASS™ can aid in lowering the dielectric constant.

As clock speeds further increase, the signal or clock pulse is not completely contained on the conductor. Instead, a portion of the signal travels through the dielectric layer adjacent to the conductor. This exposes the clock pulse to an inhomogeneous media. The clock pulse generally includes a square wave shape and contains various frequency components. Hence, the clock pulse spreads out, smears or becomes dispersed in time, because the various frequency components travel at different speeds through the inhomogeneous media. As the requirements for speed further increase, any improvement in reducing delays by changing the conductor and dielectric layer materials are limited. Further gains in reducing the delay can include a combination of reducing the conductor's length and increasing the cross-sectional area of the conductor. The costs for changing the geometry of the conductor can include more processing steps and push the limits of the statistical capability of the process.

We describe a structure for coupling a signal through a microcircuit. In an example of such a structure, a portion of an interconnect or metallization includes a microstructure for generating an electromagnetic wave. The electromagnetic wave carries a signal and is coupled from the microstructure and throughout the microcircuit using a dielectric layer of the microcircuit.

BRIEF DESCRIPTION OF THE DRAWINGS

The following description, given with respect to the attached drawings, may be better understood with reference to the non-limiting examples of the drawings, wherein.

DETAILED DESCRIPTION OF THE PRESENTLY PREFERRED EXEMPLARY EMBODIMENTS

Figure 1:
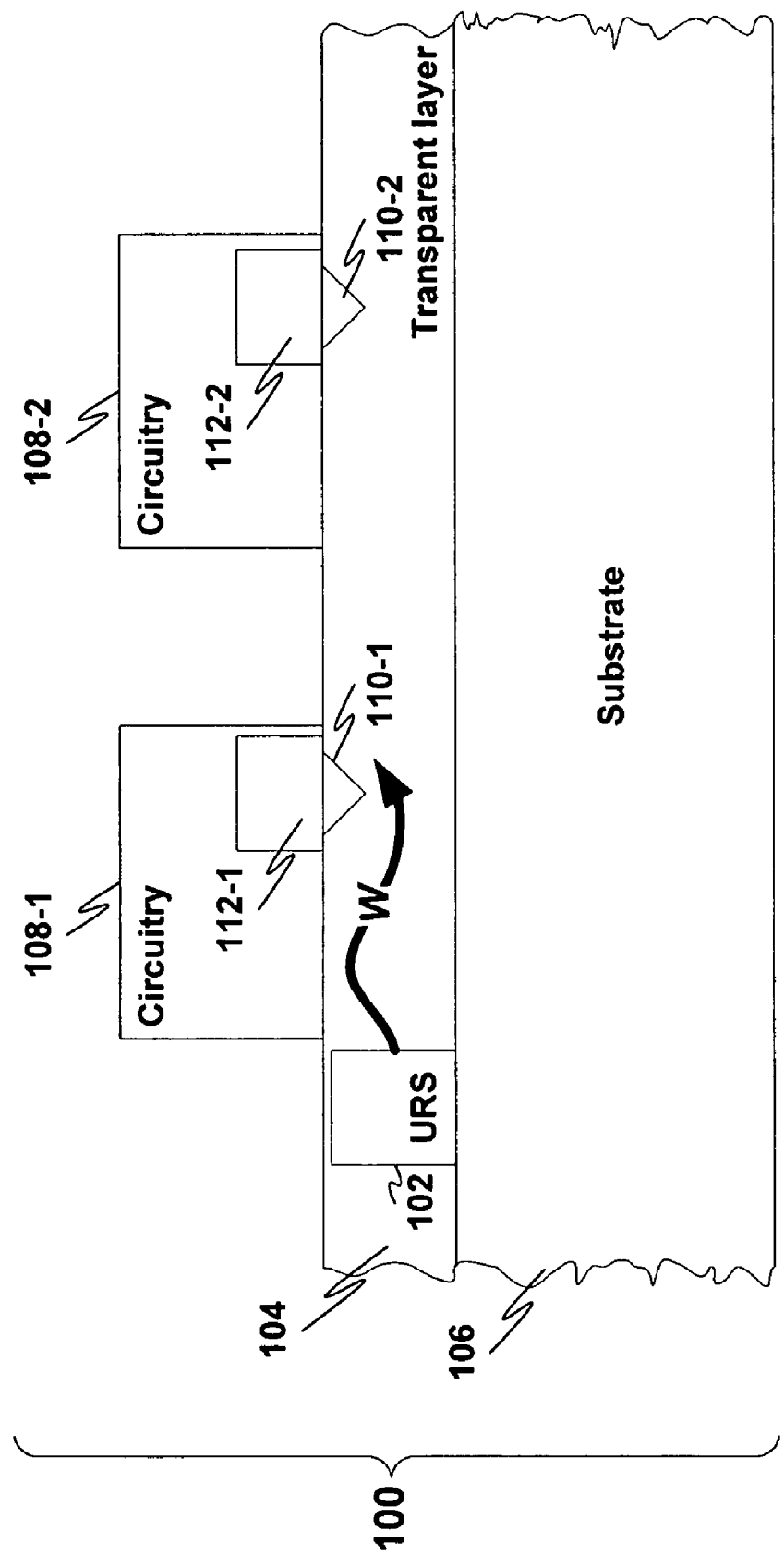
FIGS. 1-3 show side views of devices/structures for coupling signals through a microcircuit.

FIG. 1 is a side view of a device 100 in which an ultra-small resonant structure 102 is formed within a non-conductive waveguide layer 104 on a substrate 106.

In general, the ultra-small resonant structure is one which emits electro-magnetic radiation (EMR) when exposed to a beam of charged particles. The structure 102 may be, e.g., one or more of the resonant structures described in one or more of the related applications, each of which is described in greater detail above: U.S. application Ser. Nos. 11/243, 476; 11/243,477; 11/238,991; 11/302,471; 11/325,432; 11/325,448; 11/325,571; and 11/325,534. In particular, the structure 102 may be one which emits light at a particular wavelength, e.g., visible light. Thus, the ultra-small resonant structure 102 emits an EMR wave (denoted W) in the waveguide layer 104. The wave W may be modulated or otherwise manipulated to carry a data signal such as, e.g., a clock signal.

The waveguide layer 104 is preferably transparent at the wavelength of the EMR (light) emitted by the structure 102. So, e.g., in the case of visible light, the waveguide layer 104 may comprise silica (silicon dioxide, $SiO_2$). Thus the wave W emitted by the structure 102 (and therefore the data signal in the wave) is carried throughout the waveguide layer 104.

Various electronic circuits 108-1, 108-2 (generally 108) are formed on the transparent waveguide layer 104. The various circuits 108 may each perform a different function and may be formed using known techniques. The invention is not limited by the nature of function of the circuits 108. Each circuit 108 is operatively connected to the waveguide layer 104 so as to receive the wave W being carried in the layer (and thereby to receive any data signal—e.g., a clock signal—carried in the wave).

A circuit 108 may couple to the waveguide layer 104, e.g., by forming a small defect in the layer in order to direct some of the light in the layer to the circuit 108. Thus, e.g., as shown in the drawing, circuit 108-1 connects operatively to the waveguide layer 104 via defect 110-1. A light detector (e.g., a CMOS detector) 112-1 couples light from the defect 110-1 to the circuit 108-1. A similar structure may be used for the other circuit 108-2.

As an alternative mode of connection, some or all of the circuits 108 may connect to the waveguide layer 104 using a detector such as, e.g., described, in related application Ser. No. 11/400,280, described in greater detail above and incorporated herein by reference.

Those skilled in the art will realize and understand, upon reading this description, that the substrate may be (or be formed on) a printed circuit board (PCB) or the like. Further, although only two circuits 108 are shown in the drawings, those skilled in the art will realize and understand, upon reading this description, that any number of circuits may be connected to the transparent layer in order to receive the same data signal in the wave W generated by the ultra-small structure 102. The resonant structure 102 could be on top of or under the circuits and could be positioned anywhere in the waveguide.

Figure 2:
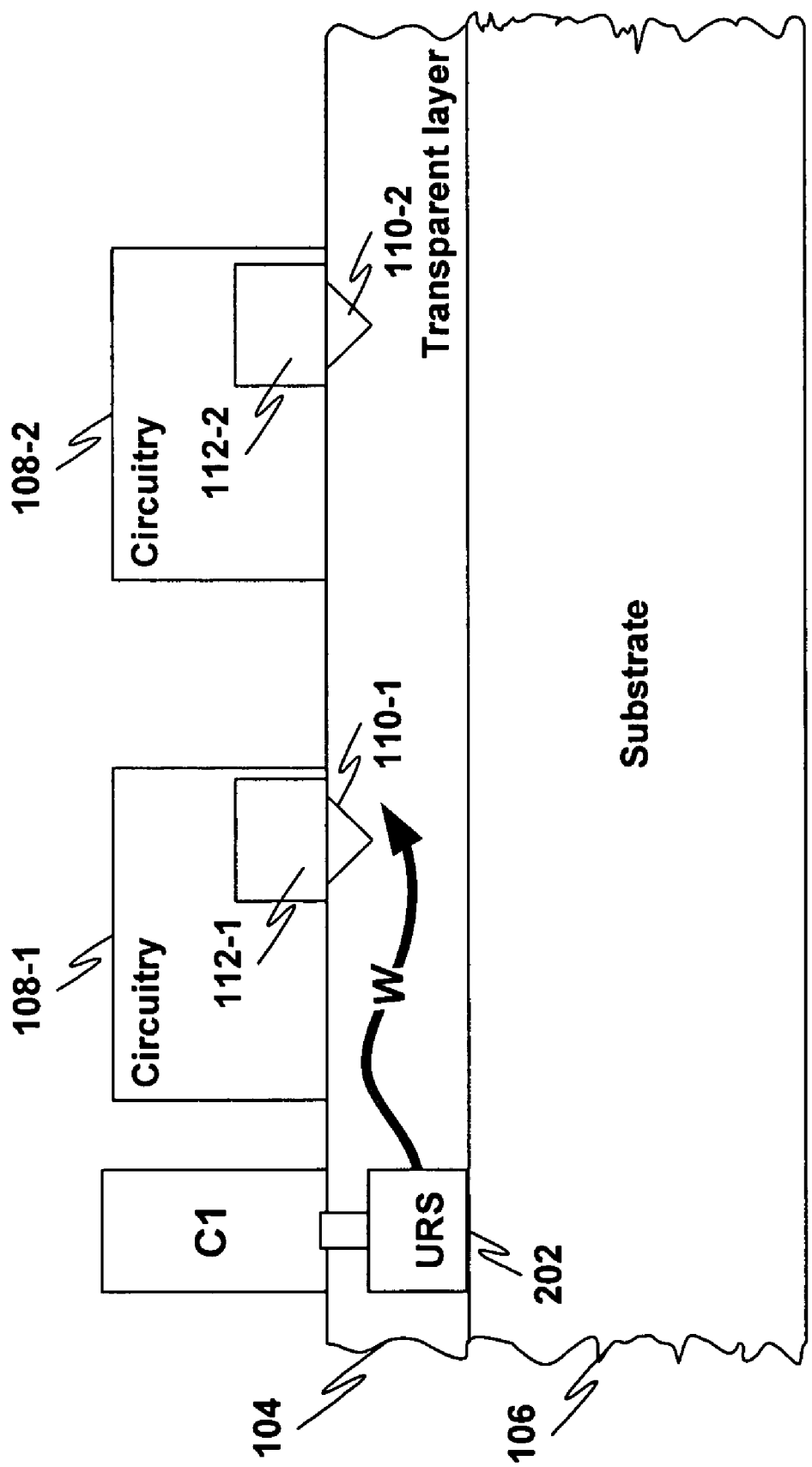

As shown in FIG. 2, the resonant structure 202 may be coupled to another device/circuit (denoted C1 in the drawing) in order to provide a signal from that device to the other circuits 108.

As noted above, the wave W may carry an encoded signal such as a clock signal. Thus, anywhere a clock signal is required, it can be obtained via a connection (e.g., using a defect) to the waveguide layer.

Those skilled in the art will realize and understand, upon reading this description, that the waveguide layer covers a sufficient portion of the substrate to allow connection to all circuits formed thereon. In some cases, the waveguide layer may cover substantially all of the substrate.

Those skilled in the art will further realize and understand, upon reading this description, that more than one waveguide layer may be formed on a substrate, thereby allowing more than one data (e.g., clock) signal to be provided to different ones of the circuits formed thereon. Thus, as shown for example in FIG. 3, a circuit 308 is operatively connected to each of two waveguide layers 304-A, 304-B. Ultra-small resonant device 302-A emits EMR (e.g., visible light) at a wavelength $W_A$ in waveguide layer 304-A. Similarly, ultra-small resonant device 302-B emits EMR (e.g., visible light) at a wavelength $W_B$ in waveguide layer 304-B. Each of the waveguide layers 304-A, 304-B is preferably transparent at the wavelength of the EMR (light) emitted by the corresponding structure 302A, 302-B, respectively. If the two waveguide layers 304-A, 304-B have contact locations (i.e., if they touch anywhere), then preferably the wavelengths emitted by the structures 302A, 302-B should be different.

Figure 3:
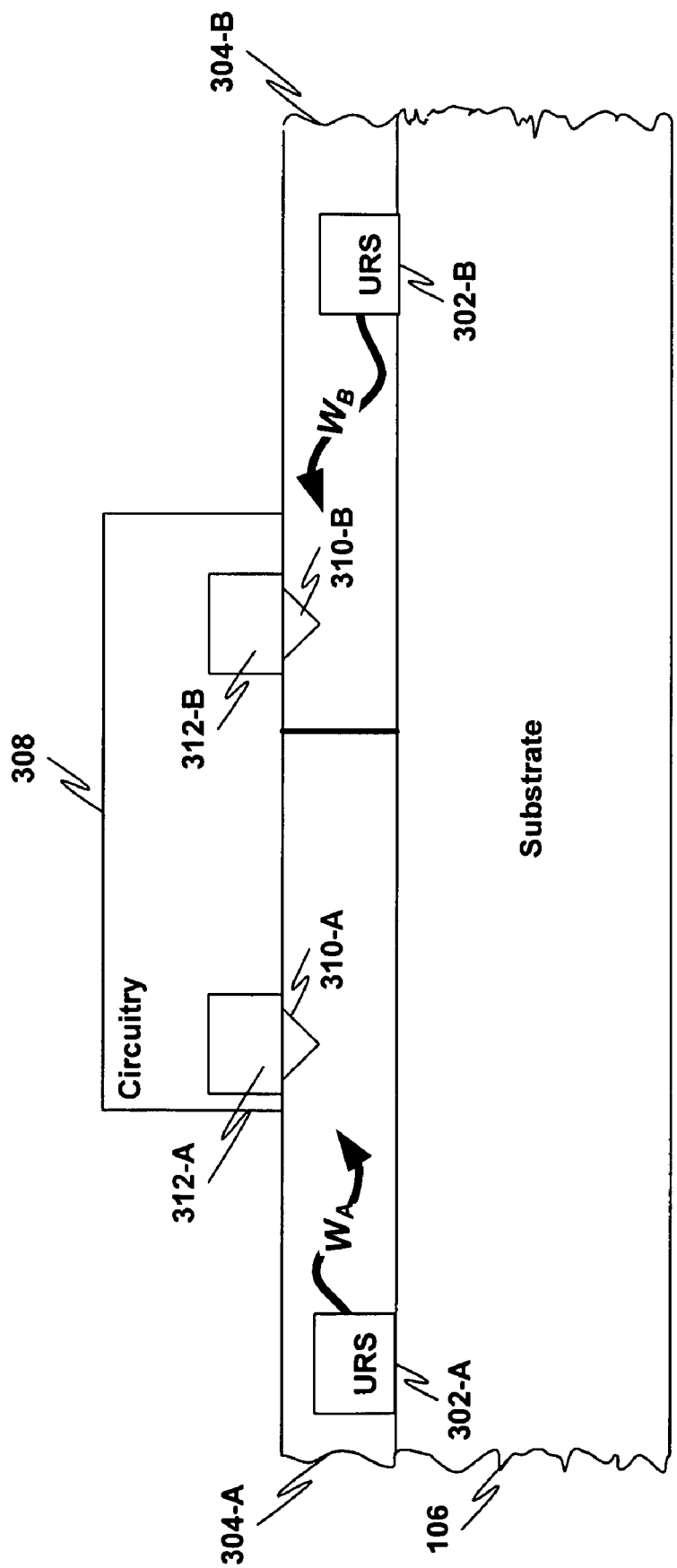

The circuit 308 may connect to each waveguide layer in the manner described above. For example, as shown in FIG. 3, the circuit 308 may connect to waveguide layer 304-A via connection 310-A and corresponding detector 312-A, and similarly to waveguide layer 304-B via connection 310-B and corresponding detector 312-B.

Although the various circuits are shown formed on the waveguide layer(s), those skilled in the art will realize and understand, upon reading this description, that only portions of the circuits need be formed on the waveguide layer(s) in order for the circuits to obtain data from the waveguide layer.

Methods of making a device for detecting an electromagnetic wave as can be employed herein may use the techniques described in related U.S. application Ser. Nos. 10/917,511 and/or 11/203,407, filed Aug. 15, 2005, entitled "Method of Patterning Ultra-Small Structures," each of which is described in greater detail above.

The devices described herein may also employ various similar or different example resonant structures to those described in one or more of the related applications, each of which is described in greater detail above: U.S. application Ser. Nos. 11/243,476; 11/243,477; 11/238,991; 11/302,471; 11/325,432; 11/325,448; 11/325,571; 11/325,534; and 11/400,280.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

GLOSSARY

As used throughout this document:

The phrase "ultra-small resonant structure" shall mean any structure of any material, type or microscopic size that by its characteristics causes electrons to resonate at a frequency in excess of the microwave frequency.

The term "ultra-small" within the phrase "ultra-small resonant structure" shall mean microscopic structural dimensions and shall include so-called "micro" structures, "nano" structures, or any other very small structures that will produce resonance at frequencies in excess of microwave frequencies.

As the term is used herein, the structures are considered ultra-small when they embody at least one dimension that is smaller than the wavelength of visible light. The ultra-small structures are employed in a vacuum environment.

The invention claimed is:

1. A device comprising:
   a waveguide layer formed on a substrate;
   an ultra-small resonant structure constructed and adapted to emit electromagnetic radiation (EMR) in said waveguide layer;
   one or more circuits formed on said waveguide layer and each operatively connected thereto to receive the EMR emitted by the ultra-small resonant structure.

2. A device as in claim 1 wherein the waveguide layer is transparent at wavelengths corresponding to wavelengths of the EMR emitted by the ultra-small resonant structure.

3. A device as in claim 2 wherein the EMR is visible light.

4. A device as in claim 1 wherein the ultra-small resonant structure emits EMR which encodes a data signal.

5. A device as in claim 4 wherein the data signal comprises a clock signal.

6. A device as in claim 1 wherein the ultra-small resonant structure is constructed and adapted to emit electromagnetic radiation (EMR) in response to excitation by a beam of charged particles.

7. A device as in claim 6 wherein the charged particle beam comprises particles selected from the group comprising: electrons, positive ions, negative ions, positrons and protons.

8. A device as in claim 6 further comprising:
   a source providing a charged particle beam.

9. A device as in claim 8 wherein said source of charged particles is selected from the group comprising:
   an ion gun, a tungsten filament, a cathode, a planar vacuum triode, an electron-impact ionizer, a laser ionizer, a chemical ionizer, a thermal ionizer, and an ion-impact ionizer.

10. A device as in claim 1 wherein the ultra-small resonant structure is constructed and adapted to emit at least one of visible light, infrared light, and ultraviolet light.

11. A method comprising:
    providing a plurality of circuits operatively connected to a waveguide layer; and
    emitting, by an ultra-small resonant structure, an electromagnetic signal into said waveguide layer, whereby said signal may be obtained by each of said plurality of circuits.

12. A method as in claim 11 wherein said signal encodes a clock signal.

13. A method as in claim 11 wherein said signal is encoded in visible light.

14. A method as in claim 11 wherein the ultra-small resonant structure is constructed and adapted to emit electromagnetic radiation (EMR) in response to excitation by a beam of charged particles.

15. A method as in claim 14 wherein the charged particle beam comprises particles selected from the group comprising: electrons, positive ions, negative ions, positrons and protons.

16. A method as in claim 14 wherein a source of said beam of charged particles is selected from the group comprising:
    an ion gun, a tungsten filament, a cathode, a planar vacuum triode, an electron-impact ionizer, a laser ionizer, a chemical ionizer, a thermal ionizer, and an ion-impact ionizer.

17. A method as in claim 14 wherein the ultra-small resonant structure is constructed and adapted to emit at least one of visible light, infrared light, and ultraviolet light.

18. A method of providing a clock signal to a plurality of circuits, the method comprising:
    providing a waveguide layer and operatively connecting each of the circuits to the waveguide layer; and
    using an ultra-small resonant structure to emit an electromagnetic signal into said waveguide layer, whereby said signal may be obtained by each of said plurality of circuits, wherein said signal encodes a clock signal.

19. A method as in claim 18 wherein said signal is encoded in visible light.

20. A method as in claim 18 wherein the ultra-small resonant structure is constructed and adapted to emit electromagnetic radiation (EMR) in response to excitation by a beam of charged particles.

21. A method as in claim 20 wherein the charged particle beam comprises particles selected from the group comprising: electrons, positive ions, negative ions, positrons and protons.

22. A method as in claim 20 wherein a source of said beam of charged particles is selected from the group comprising:
    an ion gun, a tungsten filament, a cathode, a planar vacuum triode, an electron-impact ionizer, a laser ionizer, a chemical ionizer, a thermal ionizer, and an ion-impact ionizer.

23. A method as in claim 20 wherein the ultra-small resonant structure is constructed and adapted to emit at least one of visible light, infrared light, and ultraviolet light.

* * * * *